(12) United States Patent  (10) Patent No.: US 9,268,663 B1
Siddiqui et al.  (45) Date of Patent: Feb. 23, 2016

(54) SOFTWARE TESTING ANALYSIS AND CONTROL

(75) Inventors: Muhammad Ali Siddiqui, Snoqualmie, WA (US); Kendra A. Yourtee, Seattle, WA (US); Amos Dylan Vance, Redmond, WA (US); Ivan Eduardo Gonzalez, Seattle, WA (US); Thomas L. Keller, Renton, WA (US); Peter V. Commons, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 474 days.

(21) Appl. No.: 13/445,482

(22) Filed: Apr. 12, 2012

(51) Int. Cl.
*G06F 9/44* (2006.01)
*G06F 11/34* (2006.01)
*G06F 11/36* (2006.01)

(52) U.S. Cl.
CPC ........ *G06F 11/3447* (2013.01); *G06F 11/3404* (2013.01); *G06F 11/3457* (2013.01); *G06F 11/3664* (2013.01)

(58) Field of Classification Search
CPC ............ G06F 11/3447; G06F 11/3457; G06F 11/3404; G06F 11/3664
See application file for complete search history.

(56) References Cited

U.S. PATENT DOCUMENTS

| | | | | |
|---|---|---|---|---|
| 5,333,302 A * | 7/1994 | Hensley | ............... | G06F 11/3414 703/22 |
| 6,732,139 B1 * | 5/2004 | Dillenberger et al. | ........ | 718/102 |
| 6,904,594 B1 * | 6/2005 | Berry | .................. | G06F 11/3404 717/130 |
| 7,076,767 B1 | 7/2006 | Williams | | |
| 7,155,462 B1 * | 12/2006 | Singh et al. | .................... | 717/170 |
| 7,383,541 B1 * | 6/2008 | Banks et al. | .................. | 717/131 |
| 7,454,659 B1 * | 11/2008 | Gaudette | ............. | G06F 11/3664 714/33 |
| 7,490,319 B2 | 2/2009 | Blackwell et al. | | |
| 7,703,079 B1 * | 4/2010 | Burrows | ............. | G06F 11/3447 700/108 |
| 7,779,392 B2 | 8/2010 | Sashino et al. | | |
| 8,001,422 B1 | 8/2011 | Sun et al. | | |
| 8,499,286 B2 | 7/2013 | Lawrance et al. | | |
| 8,762,959 B2 | 6/2014 | Singonahalli et al. | | |
| 9,058,428 B1 * | 6/2015 | Siddiqui | ............. | G06F 11/3688 |
| 2003/0005024 A1 * | 1/2003 | Grumann | ............ | G06F 11/3447 718/102 |
| 2004/0098242 A1 * | 5/2004 | Moona | ................ | G06F 11/3447 703/22 |

(Continued)

OTHER PUBLICATIONS

Martin Randles et al., "A Comparative Study into Distributed Load Balancing Algorithms for Cloud Computing", [Online], 2010, pp. 551-556, [Retrieved from Internet on Oct. 17, 2015], <http://ieeexplore.ieee.org/stamp/stamp.jsp?tp=&arnumber=5480636>.*

(Continued)

*Primary Examiner* — Thuy Dao
*Assistant Examiner* — Ziaul A Chowdhury
(74) *Attorney, Agent, or Firm* — Lee & Hayes, PLLC

(57) ABSTRACT

This disclosure is directed in part to testing of different versions of software or software components (software versions) and analyzing results of use (e.g., user interaction) of the different software versions. The techniques described herein provide software testing that varies the allocation to enable a ramp up of allocations to/from another software version. The allocation module may use allocation rules to assign requests to each software version based on various factors such as load balancing, user attributes, past user assignment, and/or other rules or logic. An analysis of the different software versions may include an analysis of system performance resulting from operation of each software version. An analysis may determine attributes of each user and then allocate the user to a software version based on at least some of the determined attributes.

22 Claims, 7 Drawing Sheets

(56) References Cited

U.S. PATENT DOCUMENTS

| | | | |
|---|---|---|---|
| 2004/0148152 A1* | 7/2004 | Horikawa | G06F 11/3447 703/22 |
| 2004/0168153 A1* | 8/2004 | Marvin | 717/120 |
| 2004/0172618 A1* | 9/2004 | Marvin | 717/116 |
| 2004/0261070 A1* | 12/2004 | Miller et al. | 717/170 |
| 2005/0091651 A1* | 4/2005 | Curtis et al. | 717/168 |
| 2005/0166094 A1* | 7/2005 | Blackwell | G06F 11/3664 714/38.14 |
| 2006/0143595 A1 | 6/2006 | Dostert et al. | |
| 2007/0050844 A1* | 3/2007 | Lebel | G06F 11/3414 726/13 |
| 2007/0094651 A1* | 4/2007 | Stephens et al. | 717/151 |
| 2007/0240108 A1* | 10/2007 | Dorn et al. | 717/114 |
| 2007/0250631 A1 | 10/2007 | Bali et al. | |
| 2008/0263538 A1* | 10/2008 | Bando et al. | 717/171 |
| 2008/0270997 A1 | 10/2008 | Murray et al. | |
| 2008/0282230 A1* | 11/2008 | Belvin et al. | 717/125 |
| 2008/0301667 A1* | 12/2008 | Rao et al. | 717/172 |
| 2008/0301672 A1* | 12/2008 | Rao et al. | 717/177 |
| 2009/0006071 A1* | 1/2009 | Dournov | G06F 11/3457 703/22 |
| 2009/0106256 A1 | 4/2009 | Safari et al. | |
| 2009/0125891 A1 | 5/2009 | Garimella et al. | |
| 2009/0199160 A1 | 8/2009 | Vaitheeswaran et al. | |
| 2009/0210866 A1* | 8/2009 | Troan | 717/168 |
| 2009/0248699 A1* | 10/2009 | Alvarez et al. | 707/10 |
| 2009/0293061 A1* | 11/2009 | Schwinn et al. | 718/103 |
| 2010/0161281 A1* | 6/2010 | Brown | G06F 11/3664 702/186 |
| 2010/0306356 A1* | 12/2010 | Gao et al. | 709/222 |
| 2010/0318986 A1* | 12/2010 | Burke et al. | 717/176 |
| 2011/0035740 A1* | 2/2011 | Powell et al. | 717/170 |
| 2011/0083129 A1* | 4/2011 | Masaki | 717/175 |
| 2011/0172985 A1* | 7/2011 | Mangold | G06F 11/3457 703/21 |
| 2011/0289512 A1* | 11/2011 | Vecera et al. | 719/313 |
| 2012/0084407 A1 | 4/2012 | Soulios et al. | |
| 2012/0324435 A1* | 12/2012 | Somani et al. | 717/170 |
| 2013/0036402 A1* | 2/2013 | Mutisya et al. | 717/124 |
| 2013/0124610 A1 | 5/2013 | Smith et al. | |

OTHER PUBLICATIONS

Bruce S. Siegell et al., "Automatic Generation of Parallel Programs with Dynamic Load Balancing", [Online], 1994, pp. 166-175, [Retrieved from Internet on Oct. 17, 2015], <http://ieeexplore.ieee.org/stamp/stamp.jsp?tp=&arnumber=340247>.*

Anne Martens et al. "Automatically Improve Software Architecture Models for Performance, Reliability, and Cost Using Evolutionary Algorithms", [Online], 2010, pp. 105-116, [Retrived from Internet on Oct. 17, 2015], <http://delivery.acm.org/10.1145/1720000/1712624/p105-martens.pdf>.*

Paul Marinescu et al., "COVRIG: A Framework for the Analysis of Code, Test, and Coverage Evolution in Real Software", [Online], 2014, pp. 93-104, [Retrieved from Internet on Oct. 17, 2015], <http://delivery.acm.org/10.1145/2620000/2610419/p93-marinescu.pdf>.*

Office Action for U.S. Appl. No. 13/445,562, mailed on Mar. 4, 2014, Muhammad Ali Siddiqui, "Software Testing Using Shadow Requests", 10 pages.

Office action for U.S. Appl. No. 13/445,562, mailed on Sep. 22, 2014, Siddiqui et al., "Software Testing Using Shadow Requests", 11 pages.

Choi, "Performance test and analysis for an adaptive load balancing mechanism on distributed server cluster systems", retrieved on Jan. 29, 2015 at <<http://www.sciencedirect.com/science/article/pii/S0167739X03001389#>>, Future Generation Computer Systems, vol. 20, Feb. 16, 2004, pp. 237-247.

Jiang, et al., "Automated Performance Analysis of Load Tests", retrieved on Jan. 29, 2015 at <<http://ieeexplore.ieee.org/xpls/abs_all.jsp?arnumber=5306331&tag=1>>, IEEE International Conference on Software Maintenance, Sep. 2009, pp. 125-134.

* cited by examiner

SOFTWARE TESTING ANALYSIS AND CONTROL

BACKGROUND

Software architects often engage in a process of improving software after deployment of the software. The improvements may be implemented by modifying a version of the software or by creating a new version of the software, where the modified or new version of the software is intended to replace the deployed (current) version of the software. Deployment of the modified or the new version of the software may have an impact on hardware that supports the version of the software (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test, often called A/B testing, to compare results following execution of the modified or new version of the software against results following execution of the deployed (current) version of the software prior to a full deployment of the modified or new version of the software.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
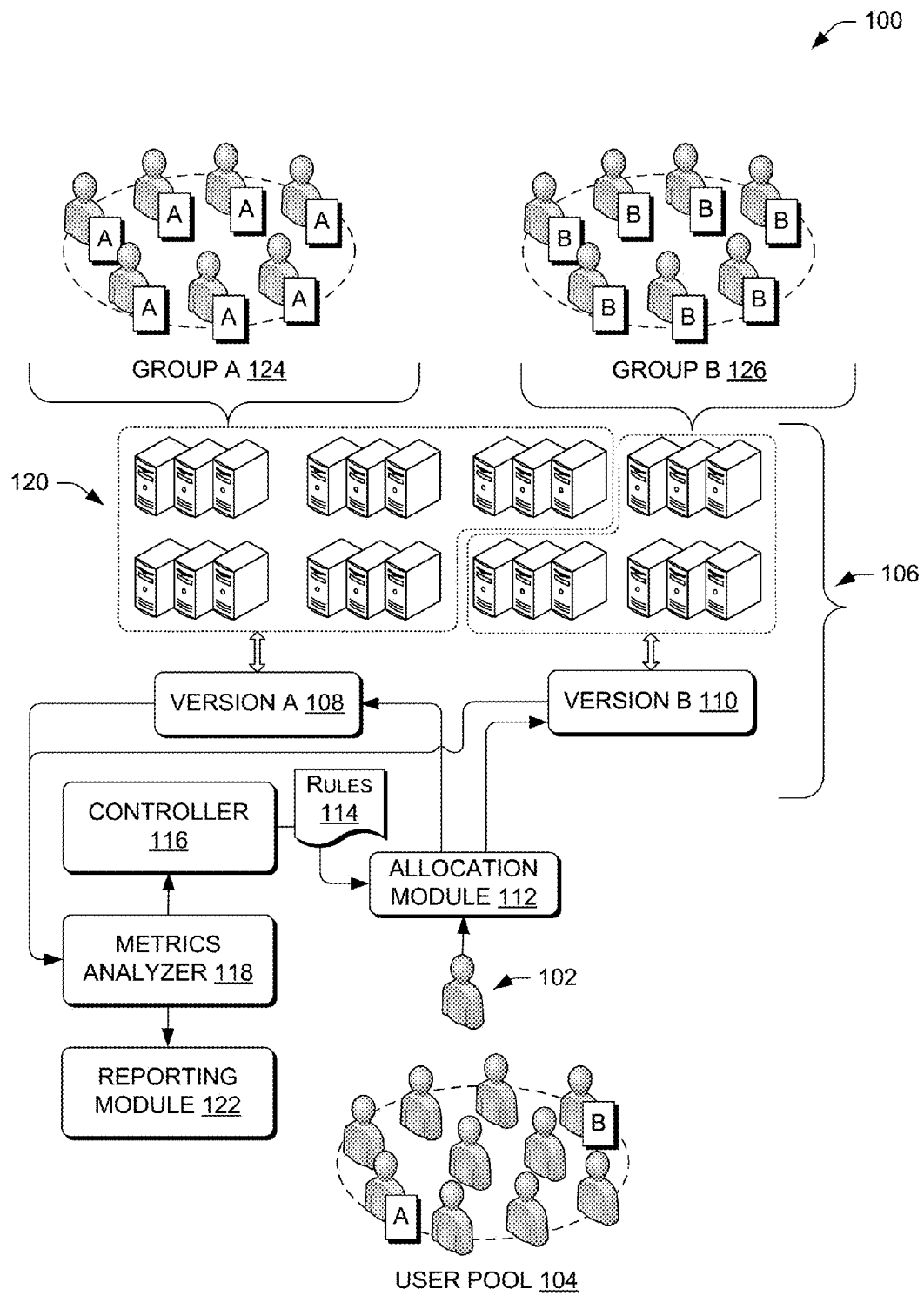
FIG. 1 is a schematic diagram of an illustrative environment that provides analysis and control of software testing.

This disclosure is directed in part to testing of different versions of software or software components (software versions) and analyzing results of use (e.g., user interaction) of the different software versions. Testing of different software versions is commonly referred to as A/B testing where users are selected to use either software "version A" or software "version B" based on a fixed allocation or schedule (e.g., 50/50 allocation, alternating allocation, etc.). However, the techniques described herein perform various operations not performed or capable of performance in conventional A/B testing. In accordance with some embodiments, the techniques described herein provide software testing that varies the allocation to enable a ramp up of allocations to/from another software version. For example, an allocation module may begin with an allocation of software version A at 100% and software version B at 0%, and then gradually decrease the allocation to software version A from 100% to 0% over time as additional samples are collected and while software version B proves to be better than software version A based on an analysis of results. The allocation module may use allocation rules to assign users and/or requests to each software version based on various factors such as load balancing, user attributes, past user assignment, and other rules or logic.

In accordance with various embodiments, the analysis of the different software versions may include an analysis of system performance resulting from operation of each software version. System performance may be based on resource consumption such as server workload, processor workload, memory allocation storage use, bandwidth, response time, and so forth. System performance may be analyzed using business metrics, system level metrics (e.g., memory, processor, etc.), and/or application level metrics (e.g., bugs, errors, etc.). In some embodiments, the analysis of different software versions may include an analysis of results of user interaction (use data) with one of the software versions. For example, the results may indicate a better or worse conversion rate (e.g., click through, purchase, etc.), a better or worse completion rate (e.g., premature expiration of code, early exit, etc.), and/or other results from user interaction with each software version.

In various embodiments, the analysis may determine attributes of each user and then allocate the user to a software version based on at least some of the determined attributes. For example, a metrics analyzer may track sample sizes for various attributes for each software version. When a sample size is low for a particular attribute, a controller may update allocation rules to increase allocation of users having the attribute(s) to the particular software version.

In some embodiments, a controller may reallocate hardware, such as servers, processing time, or other hardware or hardware controls to accommodate processing of the software versions, particularly when the allocation rules are adjusted to direct more users (more traffic) to one of the software versions. The allocation of hardware may or may not be proportional to the allocation of users depending on factors such as an analysis of the system performance resulting from operation of the software versions.

The techniques and systems described herein may be implemented in a number of ways. Example implementations are provided below with reference to the following figures.

Illustrative Environment

FIG. 1 is a schematic diagram of an illustrative environment 100 that provides analysis and control of software testing. The environment 100 depicts users that are allocated to various versions of software. In various embodiments, a user may be allocated (or otherwise assigned) to use a particular version of software or software component (collectively "software") while interacting with a service. After assignment, the user may become part of a user group. System resources (i.e., hardware) may be dynamically allocated to support execution of the various versions of software. Modules, components, and other operators may be used to perform the allocations, analysis, and/or reporting, as described herein for the service.

As shown in FIG. 1, a downstream consumer or user 102 (referred to collectively as "user") may transmit a request via a user device for electronic data from a service 104. However, in some embodiments, the request may be a request generated by another service, the service 104, or another process, and may not be a human-generated request. Each of the users 102 may be associated with one or more user devices 102, which may include any number of components such as the one or more processor(s), computer-readable media, network interfaces, and/or displays. The users 102 may utilize the user devices to interact with the service 104 in any manner. The user 102 may include attributes 106, such as a user identifier (ID), an Internet protocol (IP) address, and/or other discoverable information.

The service 104 may be an electronic marketplace, an electronic financial service, a messaging service, a social network, and/or any other service that exchanges electronic data with a user. The service 104 may operate various versions of software that are executable in a framework. Although any number of versions of software may be used in the framework, FIG. 1 shows a version A 108 and a version B 110 as representative software versions that are used for discussion purposes. The service 104 may deploy an allocation module 112 to allocate (or assign) the user 102 to one of the version A 108 or the version B 110 based at least in part on allocation rules 114, in accordance with various embodiments.

In some embodiments, the version A 108 and the version B 110 may be different versions of software that perform a same or similar function, but perform the function using different techniques. For example, the version A 108 may include a first user interface while the version B 110 includes a second, different, user interface that includes graphics, text, and/or other data that is different than graphics, text, and/or other data provided by version A 108. The allocation module 112 may ensure that a user is subjected to execution of one of the versions of software. Thus, the allocation module 112 may route each user in the user pool to one of the versions of the software in accordance with the allocation rules 114.

The allocation rules 114 may include rules that provide load balancing, preserve user experiences, manage sample sizes, allocate users to software versions based on statistical trends, and/or provide other allocations of the users to the various versions of the software. In accordance with various embodiments, a controller 116 may manage and update the allocation rules 114.

After a user interacts with a version of the software (e.g., version A 108 or version B 110, etc.), then a metrics analyzer 118 may obtain and analyze resultant data from the user interaction. The resultant data may include data related to system performance associated with the user interaction and the software version (e.g., load on processors, response time, bug detection, etc.) and/or results of user interaction (e.g., conversion rate, user drop rate, etc.), which is referred to herein as use data or use analysis. The metrics analyzer 118 may determine trends with the resultant data in accordance with a confident level. In some embodiments, the metrics analyzer 118 may determine or identify shortcomings in sample sizes of analyzed results.

In accordance with one or more embodiments, the metrics analyzer 118 may output results to the controller 116. The controller 116 may then use the results to update the allocation rules 114 and/or to perform other functions, such as allocated or reallocate system resources (hardware). As shown in FIG. 1, each version of the software (e.g., the version A 108 and the version B 110) is associated with system resources 120. The system resources 120 may be cloud computing services, server farm(s), or other types of resources that can be allocated to execute the various versions of the software. For example, the controller 116 may allocate a percentage, computational time value, or other amount of the system resources 120 to one of the versions of the software. As more users are allocated to a particular version of the software (e.g., the version B 110), the controller 116 may reallocate more system resources previously used to support another version of the software (e.g., the version A 108) to the particular version of the software. Thus, the controller 116 may manage the allocation rules 114 and reallocate the system resources 120 to accommodate implementation of the allocation rules 114 by the allocation module 112. The allocation of the system resources 120 may be any type of allocation, such that a single server may be allocated, in part, to service requests for each of the versions or to service requests for only a specified version. Thus, one piece of hardware may perform operations for various versions of software in accordance with some embodiments.

In various embodiments, the metrics analyzer 118 may output results to a reporting module 122. The reporting module 122 may generate reports for each version of the software related to system performance and/or to use analysis. The data from the reporting module 122 may be used by an administrator or other person, who may then provide input to the controller 116 to adjust the allocation rules 114. Thus, the controller 116 may update the allocation rules 114 dynamically based on data received directly from the metrics analyzer 118 and/or based on user input received from an administrator or other person, who may have access to reports generated by the reporting module 122.

In some embodiments, users that have been allocated to use a particular version of the software may be assigned to a group. The environment 100 shows a group A 124 and a group B 126, which correspond to users that were allocated to the version A 108 and the version B 110, respectively. However, more groups may be used to store information about the users. When a user returns to the service 104, the allocation module 112 may use information from the user's group (and/or other attributes of the user) when applying the allocation rules 114. For example, an example allocation rule may instruct the allocation module 112 to allocate a previous user that has already been assigned to one of the version A 108 or the version B 110 to the same version as last time to provide the user with a consistent experience with the service 104. However, the opposite scenario may also be used to provide a direct comparison of the user's actions. When the version B 110 is an update to a current version labeled as the version A 108, then an example allocation rule may allow unilateral movement of a user from the version A to the version B, but not the opposite direction.

Figure 2:
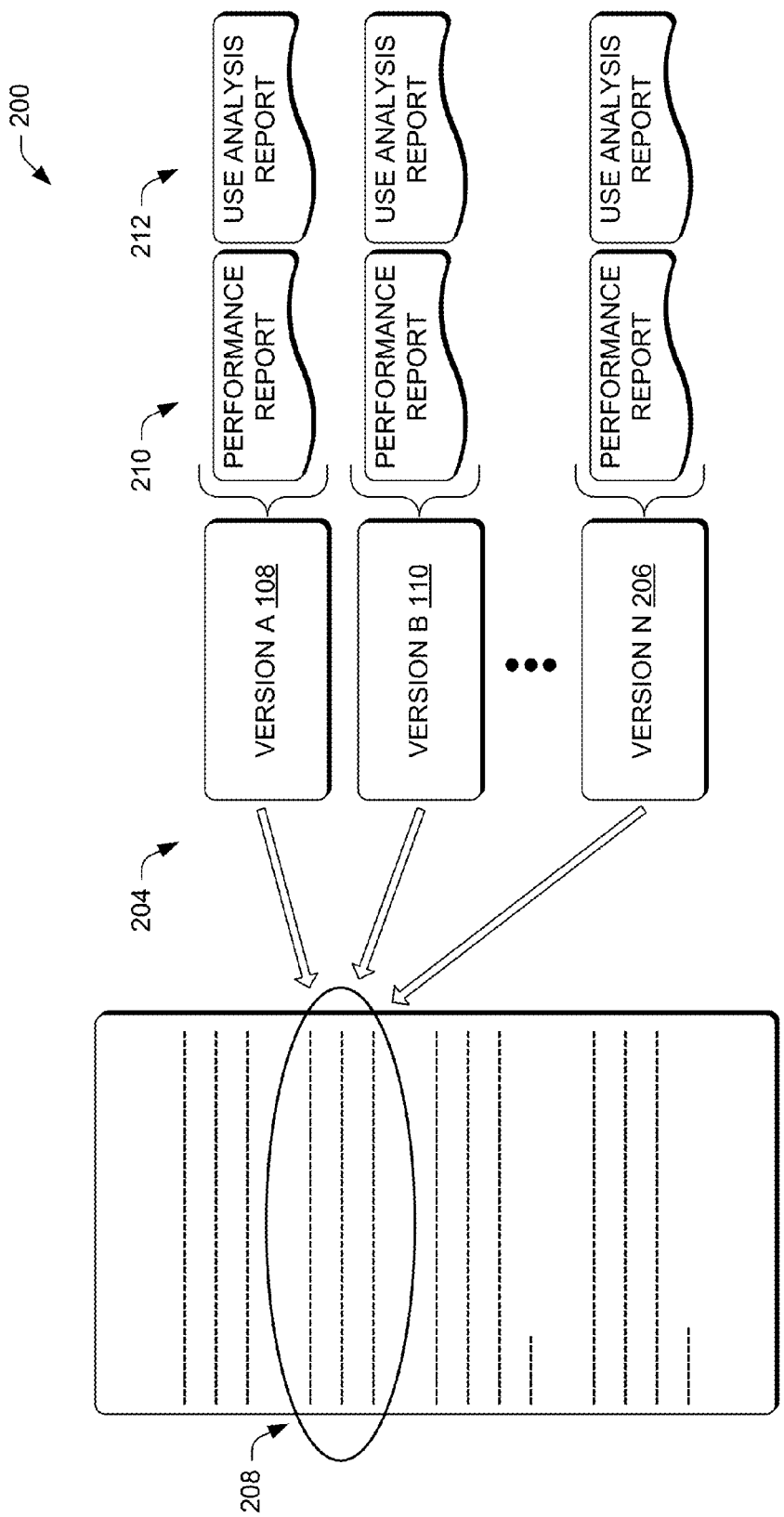
FIG. 2 is a schematic diagram of illustrative software that includes a framework and various versions of software components that may be used interchangeably with the framework during software testing.

FIG. 2 is a schematic diagram of illustrative software 200 that includes a framework 202 and various versions of software 204 that may be used interchangeably with the framework during software testing. The framework 202 may be configured to allow use of the different versions of the software 204, such as the version A 108, the version B 110, . . . , a version N 206, and so forth. As discussed above, any number of versions of software may be tested during a testing cycle. The framework may include a call 208, which may direct execution of one of the versions of software 204 based on the outcome of the allocation module 112 as discussed above. The allocation module 112 may determine the software version at any point in time before the call 208 to the software version. In some embodiments, the allocation module 112 may determine the software version prior to a point of execution of the software version (e.g., as an initial operation rather than just prior to execution of the software version). The versions of the software 204 may be stand-alone software that can be implemented or deployed without modification of the code in a selected version of the software.

In accordance with various embodiments, each version of software may include a performance report 210 and/or a use analysis report 212. The performance report 210 and/or the use analysis report 212 may be combined reports that list each version of software together or may be separate reports for each version of the software. The reporting module 122 may generate the performance report 210 and the use analysis report 212, which may provide data used to update the allocation rules 114 for the software versions. For example, when the performance report 210 for the version B 110 indicates intensive use of system resources for each user, the allocation rules 114 may be modified to reduce allocations of users to the version B in favor of an allocation to a software version having a less intense use of the system resources (e.g., the version A 108 or the version N 206). In another example, when the user analysis report 212 for the version A 110 indicates that a desired metric value is less than the desired metric value associated with the version B 110, then the allocation rules 114 may be modified to reduce allocations of users to the version A in favor of an allocation to the version B. In some embodiments, the desired metric value may be a conversion (e.g., a selection, click through, etc.), a completion of the software version, passage of a predetermined amount of time, or another predetermined output.

Illustrative Computing Architecture

Figure 3:
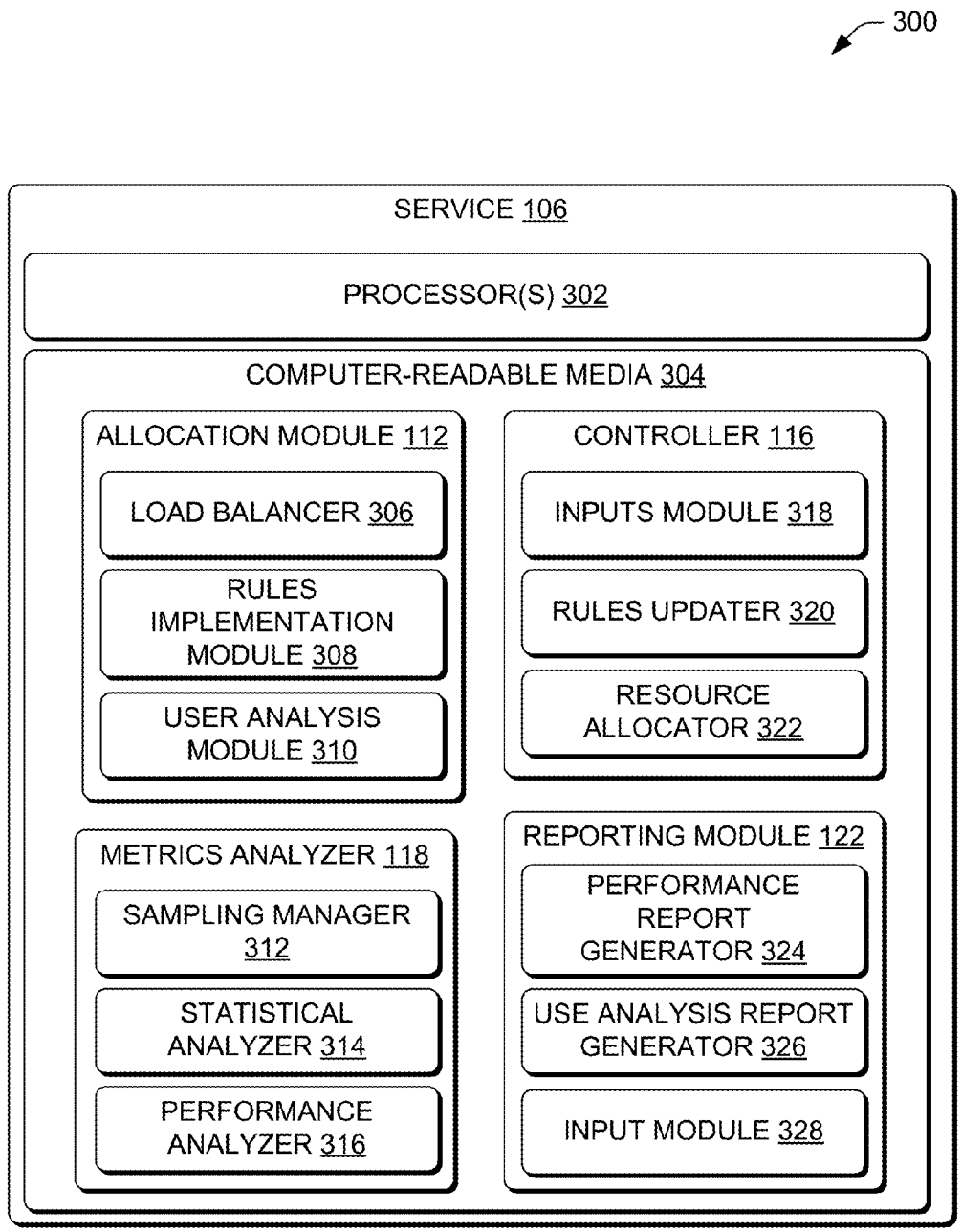
FIG. 3 is a schematic diagram of an illustrative computing architecture to provide analysis and control of software testing.

FIG. 3 is a schematic diagram of an illustrative computing architecture 300 to provide analysis and control of software testing. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 304 may store the allocation module 112 and associated components, the metrics analyzer 118 and associated components, the controller 116 and associated components, and the reporting module 122 and associated components, which are described in turn. The components may be stored together or in a distributed arrangement.

Illustrative Components of the Allocation Module

In accordance with various embodiments, the allocation module 112 may include a load balancer 306, a rules implementation module 308, and a user analysis module 310.

The load balancer 306 may allocate users to versions of the software based on availability of the system resources or other factors to ensure minimal disruption, delay, or latency when allocating the users to the versions of software. In some instances, the load balancer 306 may override implementation of an allocation rule in order to prevent a delay or latency that exceeds a threshold value.

The rules implementation module 308 may receive, interpret, and apply the allocation rules 114 that are generated by the controller 116. In some instances, the rules interpretation module 308 may access user attributes when deciding how to apply the allocation rules. For example, the rules implementation module 308 may determine when a user has accessed the service 104 previously, and may base a current allocation on an allocation used in a last session with the service (e.g., direct the user to the same version of software as last time, etc.). In some embodiments, the rules implementation module 308 may allocate users to a particular version when the users have desired attributes, which increase a sample size of users with the attribute for that particular version.

The user analysis module 310 may extract user attributes. For example, the user analysis module 310 may receive data from a user such as a user identifier (ID), location information, an Internet Protocol (IP) address, previous access records, browsing history, and/or other data. The analysis module 310 may use cookies or other stored data (via cloud storage, browser storage, or other types of storage) to capture information about the user.

Illustrative Components of the Metrics Analyzer

In accordance with various embodiments, the metrics analyzer 118 may include a sampling manager 312, a statistical analyzer 314, and a performance analyzer 316.

The sampling manager 312 may measure and obtain data from the use of the versions of the software. The sampling manager 312 may determine which types of users having particular attributes are desirable for a particular version of software. The sampling manager 312 may receive a predetermined confidence level and then calculate the number of samples necessary to achieve the predetermined confidence level. Generally, the sampling manager 312 may look at the raw data from use of the various versions of software and then output desired allocations to those versions based on factors such as a confidence level.

The statistical analyzer 314 may derive use result metrics based on the user interaction with the various versions of the software. The statistical analyzer 314 may determine positive or negative trends for each version of the software. For example, the statistical analyzer 314 may determine that a particular user attribute is indicative or correlated with a particular outcome (either good or bad). The statistical analyzer 314 may then indicate or record the trend to enable the controller 116 to adjust the allocation rules 114 accordingly. For example, the statistical analyzer 314 may determine that users from one location or region have statistically significant difference in use results for a version of software as compared with another version of software. The statistical analyzer 314 may also use confidence levels when determining the trends and compiling the use result metrics.

The performance analyzer 316 may determine system performance metrics and/or trends based on performance of each of the various versions of the software. The performance analyzer 316 may determine how the system resources are responding to use of the versions of software, include processing of spikes in user activity, response time, memory allocation, throughput, bandwidth, or other system performance measurement attributes. The system performance may be analyzed using business metrics, system level metrics (e.g., memory, processor, etc.), and/or application level metrics (e.g., bugs, errors, etc.). The performance analyzer 316 may also determine when a version of the software includes a bug or other error.

Illustrative Components of the Controller

In accordance with various embodiments, the controller 116 may include an inputs module 318, a rule updater 320, and a resource allocator 322.

The inputs module 318 may receive inputs from the metrics analyzer 118 and/or from an administrator or other person via the reporting module 122. The inputs module 318 may format the inputs to facilitate update of the allocation rules 114. The inputs module 318 may access a schedule that provides a ramp up or ramp down of allocations between the versions of the software.

The rule updater 320 may update the allocation rules 114, such as by creating new allocation rules or modifying existing allocation rules. For example, the rule updater 320 may adjust a percentage of allocated users to a particular version of software to ensure that the particular version receives about a predetermined threshold amount of users even when some users are routed to other versions based on other factors (e.g., previous allocation data, user attributes for sample size, etc.). The rule update 320 may transmit the updated allocation rules to the allocation module 112 or make the updated rules available for use by the allocation module 112. In some embodiments, the rule updater 320 may modify the allocation rules to decrease an allocation of the users to a version of software when the version of software is determined to have an anomaly in a use of the system resources 120 per user than another version of the of software based on metrics associated with system performance.

In some embodiments, the rule updater 320 may update the allocation rules 114 to shift allocations between a current version of software (e.g., the version A 108) and another version of software (e.g., the version B 110). For example, a testing cycle may begin with an allocation of 100% to the version A and 0% to the version B, and then over time gradually ramp up the allocation to version B to 50% using scheduled guidelines (e.g., increase percent after every x number of users, y minutes, etc.). When version B continues to perform well (e.g., no bugs, good system performance, good use analysis results, etc.), then the rule updater 320 may continue update the allocation rules to implement a gradual ramp up of allocations of users to version B to 100%, at which point the version A may be discontinued.

The resource allocator 322 may allocate or reallocate the system resources 120 to support execution and performance of the versions of software. The resource allocator 322 may use the allocation rules 114 (and any updates thereto) to determine the resource allocation. The resource allocator 322 may monitor system performance, such as via data from the performance analyzer 316 to determine allocations or reallocations of the system resources 120.

Illustrative Components of the Reporting Module

In accordance with various embodiments, the reporting module 122 may include a performance report generator 324, a use analysis report generator 326, and an input module 328.

The performance report generator 324 may generate a performance report, which may be based at least in part on an output of the performance analyzer 316. The use analysis report generator 326 may generate a use analysis report, which may be based at least in part on an output of the statistical analyzer 314. The use analysis report may include key user features, such as objectives for improvement of a version of software over another version of the software (e.g., higher conversion, higher click-through rate, etc.).

The input module 328 may enable an administrator or other person to update allocation rules or make other changes to any of the modules discussed herein. For example, the administrator or other person may view the various reports and then make changes to the input module 328 that may not otherwise be automatically updated by the rules updater 320 via the controller 116 without human intervention. Thus, the input module 328 may enable a manual override to automated updates to the allocation rules 114.

Illustrative Operation

FIGS. 4-7 are flow diagrams of illustrative processes to provide analysis and control of software testing. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

The processes are described with reference to the environment 100 and may be performed by service 104 using the allocation module 112, the controller 116, the metrics analyzer 118, and/or the reporting module 122. Of course, the processes may be performed in other similar and/or different environments.

Figure 4:
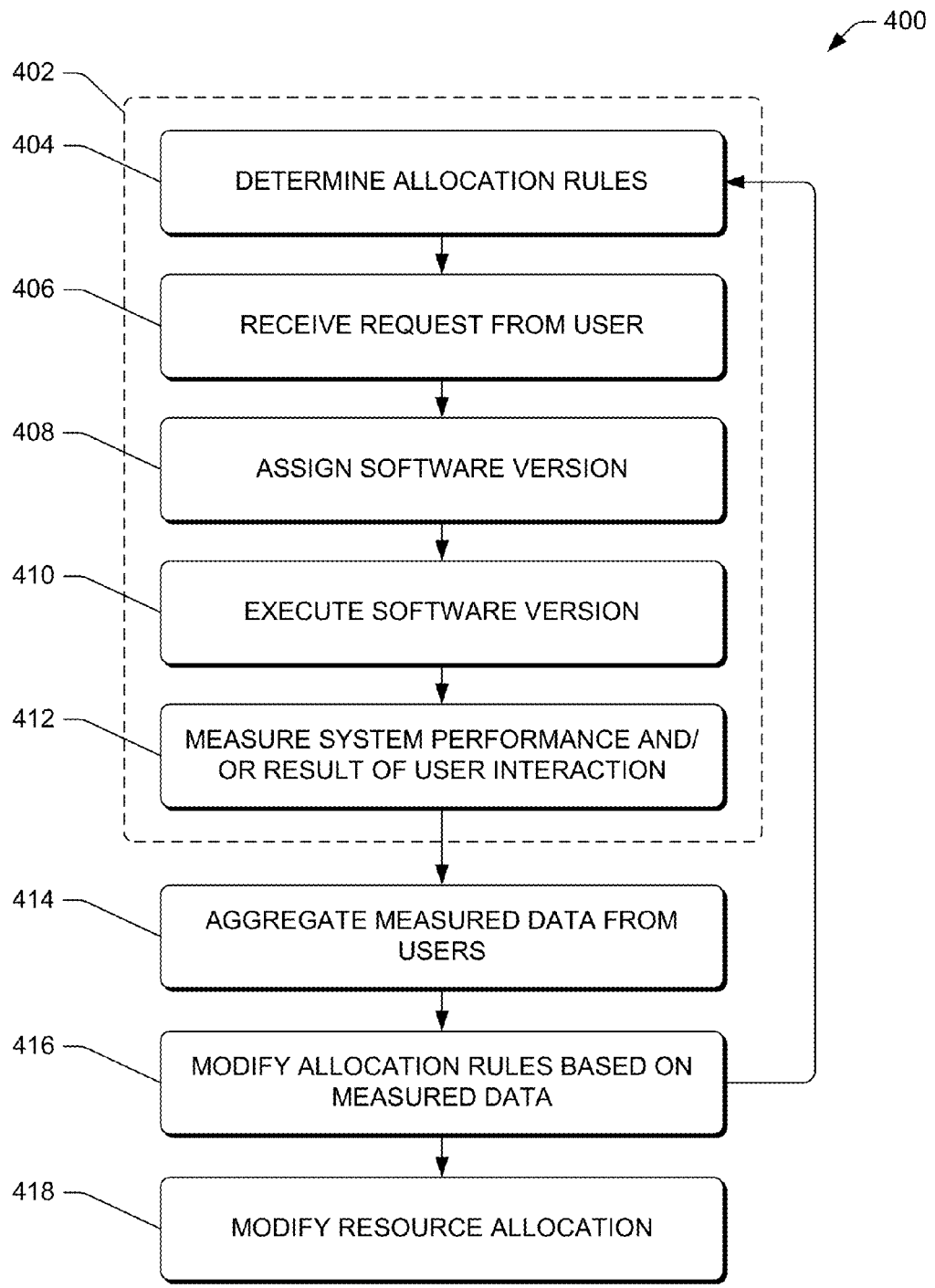
FIG. 4 is a flow diagram of an illustrative process to provide analysis and control of software testing.

FIG. 4 is a flow diagram of an illustrative process 400 to provide analysis and control of software testing. The process 400 may be performed, at least in part, by the allocation module 112 to allocate users to one of a plurality of versions of software available for execution in the framework 202.

At 402, the allocation module 112 may determine the allocation rules 114. The allocation module 112 may receive the allocation rules 114 from the controller 116 or may access the controller to obtain the rules (e.g., shared copy).

At 404, the service may perform an allocation and other related tasks for a single user. After multiple iterations of operations 404, additional processing may occur as discussed below. The operations 404 include operations 406-412, which are described in turn.

At 406, the allocation module 112 may receive a request from a user, such as the user 102. The request may be for use of the software that includes various versions, such as the plurality of versions of software.

At 408, the allocation module 112 may assign the software version for the user via an allocation. For example, the allocation module 112 may apply the allocation rules and then assign a user to use one of the versions of the software.

At 410, the service 104 may execute the assigned version of the software in the framework 202. For example, the framework 202 may make a call to the software version, which may then operate in entirety with or without additional code to call back to the framework.

At 412, the metrics analyzer 118 may measure system performance and/or results of user interaction. For example, the metrics analyzer 118 may extract an output of the version of software assigned at the operation 408, including a measurement of system resources for the execution of the version (or approximation based on batch processes of many uses of the version).

At 414, the metrics analyzer 118 may aggregate the measure data from the user and other users. The measured data may include use results and/or system performance data. The aggregation may be performed on a one by one basis or via batch processing at intervals (e.g., predetermined, periodic, random, etc.).

At 416, the controller 116 may modify the allocation rules 114 based at least in part on the measured data. For example, the controller 116 may apply a scheduled shift of allocation from one version to another version of software when the other version of software is operating in accordance with predetermined guidelines and scheduled allocation changes are due to be implemented by the controller 116.

At 418, the controller 116 may modify allocation of the system resources 120. For example, the controller 116 may modify the allocation of the system resources when the allocation rules are updated and/or in response to information from the performance analyzer 316 performed by the metrics analyzer 118.

Figure 5:
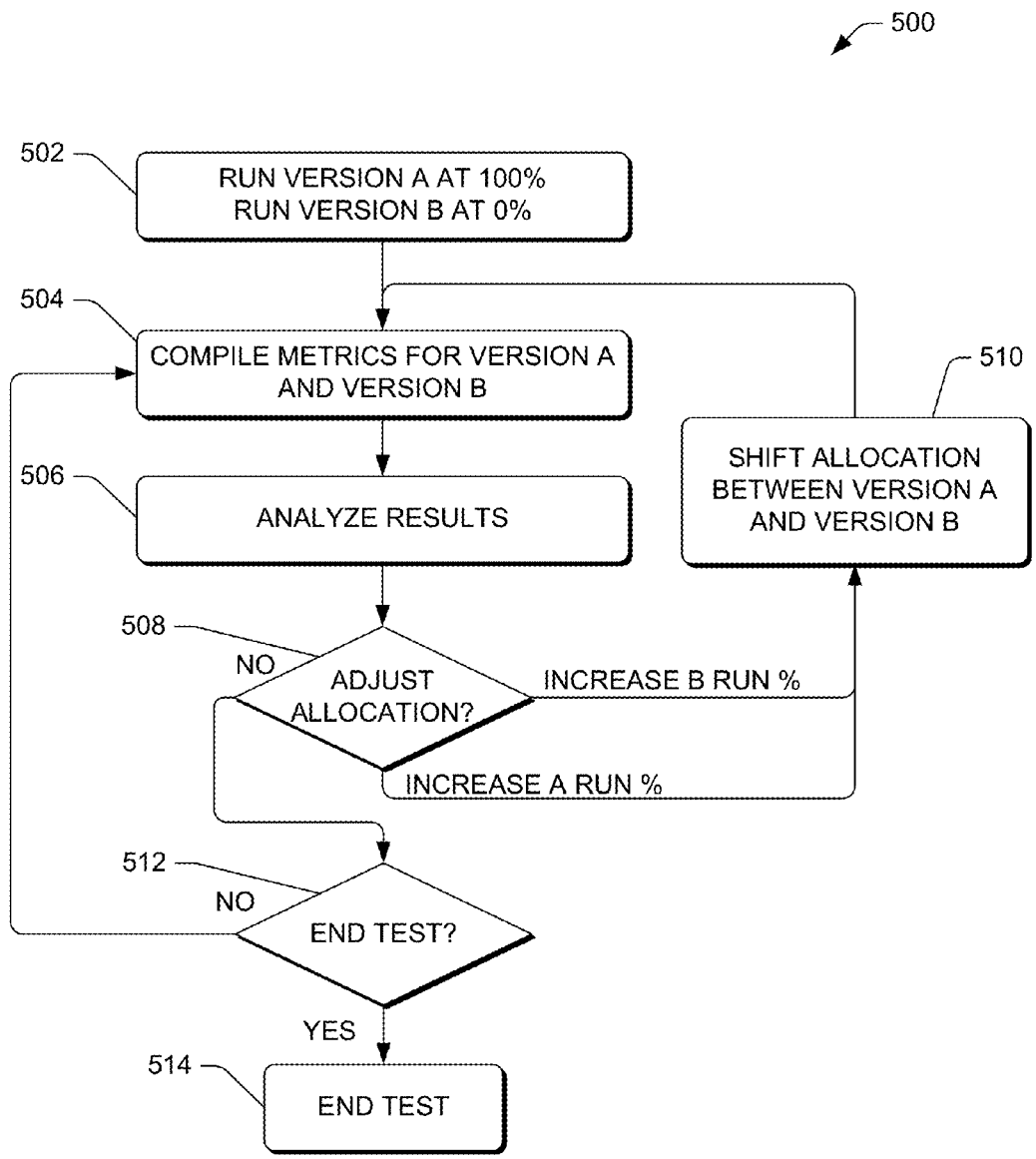
FIG. 5 is a flow diagram of an illustrative process to adjust allocation of users and resources based at least in part on an analysis of performance and/or user interaction.

FIG. 5 is a flow diagram of an illustrative process 500 to adjust allocation of users and resources based at least in part on an analysis of performance and/or user interaction. The process 500 may implement a scheduled allocation change to gradually shift users to be allocated to the version B 110 from the version A 108 (or vice versa). For example, the version B may be an updated version of the software used in the version A or both the version A and the version B may be new software subjected to a comparison test.

At 502, the controller 116 may set the allocation rules to allocate users at an initial allocation. For example, the initial allocation may allocate a larger percent of the users to the version A and a smaller percentage of the users to the version B.

At 504, the metrics analyzer 118 may compile metrics for the version A and/or the version B. Initially, the compiled metrics may create baseline metrics.

At 506, the metrics analyzer 118 may analyze the results, such as by performing statistical analysis, performance analysis, and/or other analysis of the versions and resulting data.

At 508, the controller 116 determines whether to adjust the allocation rules. The controller 116 may determine to adjust the allocation rules 114 using a schedule that gradually shifts the allocation from one version to another version when the other version is operating in accordance with expectations (e.g., same or improved system performance, same or improved use results, etc.). The controller 116 may use the data from the metrics analyzer 118 in the determination. When the controller 116 determines to increase an allocation of the version A (via the route "increase A run %"), then the allocation of the version A may be increased up to a maximum allocation of 100% at an operation 510. When the controller 116 determines to increase an allocation of the version B (via the route "increase B run %"), than the allocation of the version B may be increased up to a maximum allocation of 100% at an operation 510. At 510, the controller may shift the allocation between the version A and the version B, which may be based in part on the schedule that creates a gradual shift in the allocation.

When the controller 116 determines to make no changes (via the route "no" from the decision operation 508), then the process 500 may continue at a decision operation 512. At 512, the service 104 may determine to end a test of the version A and the version B. The test may end when the adjusted allocation places all the allocation to version B at 100%, when a steady state allocation has been reached, after passage of a predetermined amount of time, and/or in response to other factors. When the service 104 determines to end the test (via the "yes" route), then the test may end at an operation 514. When the service determine not to end the test (via the "no" route from the decision operation 512), then the process 500 may continue at the operation 504.

Figure 6:
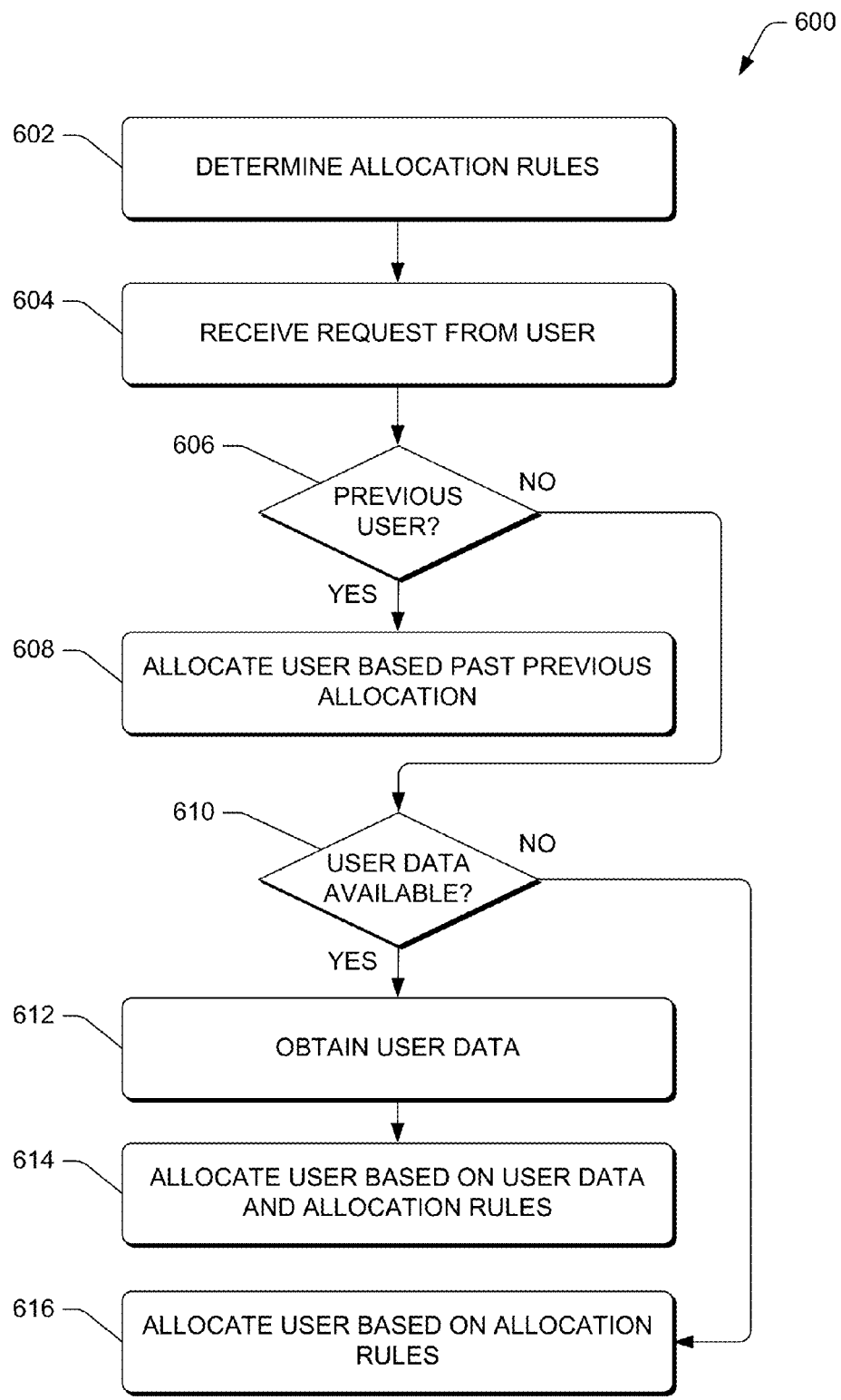
FIG. 6 is a flow diagram of an illustrative process to allocate users to versions of software.

FIG. 6 is a flow diagram of an illustrative process 600 to allocate users to versions of software. The process 600 illustrates various types of the allocation rules 114, which may be created by the controller 116 and implemented by the allocation module 112.

At 602, the allocation module 112 may determine the allocation rules 114. The determination at the operation 602 may be similar to the determination at the operation 402 described with reference to FIG. 4.

At 604, the allocation module 112 may receive a request from a user, such as the user 102.

At 606, the allocation module 112 may determine whether the user is a previous user that has been allocated to one of the plurality of versions of software available via the framework 202 (e.g., the version A, the version B, the version N, etc.). The allocation module 112 may access a user ID, cookies, and/or other data to determine whether the user is a previous user. When the user is determined to be a previous user (via the "yes" route), then the allocation module 112 may allocate the user based on the previous allocation and the allocation rules at 608. For example, the allocation rules may indicate that a previous user is to be allocated to a same version as last time, to a different version than last time, or another variation (unilateral change, etc.). When the user is not determined to be a previous user (via the "no" route from the decision operation 606), then the process 600 may advance to a decision operation 610.

At 610, the allocation module 112 may determine whether user data is available. The user data may include data about the user other than previous use information, which may be used to allocate the user (e.g., location information, age information, gender information, etc.). The user data may be derived from other available data (e.g., IP address, browsing history, cookies, user account data, user name, etc.). When the user data is available (following the "yes" route), the allocation module 112 may advance to an operation 612.

At 612, the allocation module 112 may obtain the user data. At 614, the allocation module 112 may allocate the user to a version of software based at least in part on the user data and the allocation rules 114. For example, the allocation rules may include a rule that allocates users from particular locations or regions to a particular version of the software (among other possible rules that use user data).

When the user data is not available (following the "no" route for the decision operation 610), the allocation module 112 may advance to an operation 616. At 616, the allocation module 112 may allocate the user to a version of software based at least in part on the allocation rules 114.

In some embodiments, the allocation module 112 may override the allocation rules and use an allocation from the load balancer 306. For example, the allocation may be made based on the load balancer when another allocation (made using the allocation rules) would result in a user-perceived delay or an error.

Figure 7:
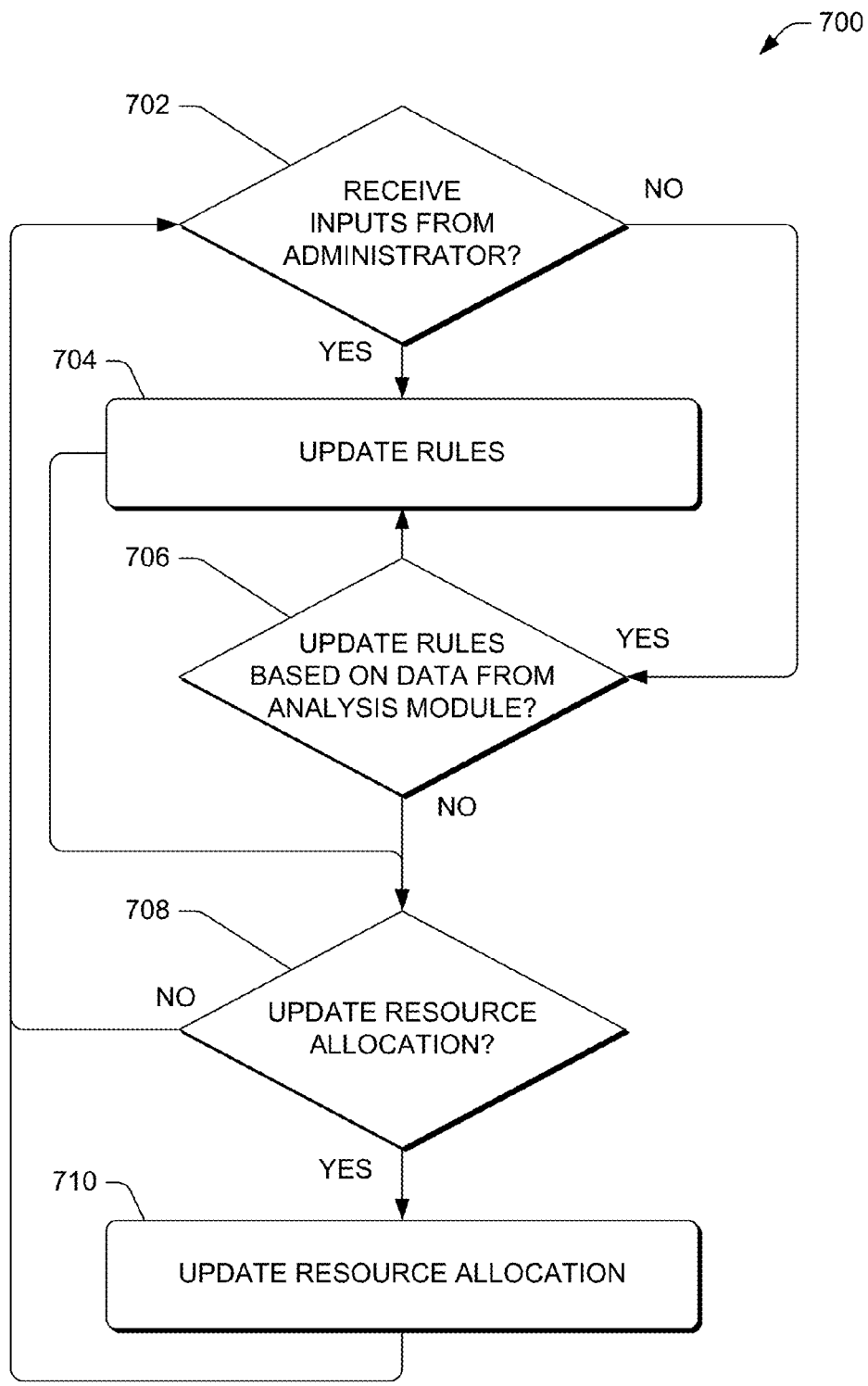
FIG. 7 is a flow diagram of an illustrative process to update rules governing allocation of users and update resource allocations.

FIG. 7 is a flow diagram of an illustrative process 700 to update rules governing allocation of users and/or update resource allocations. The process 700 may be implemented by the controller 116 to enable modification or creation of rules of the allocation rules 114.

At 702, the controller 116 may determine whether inputs are received from the input module 328 of the reporting module 122. For example, the inputs may be entered by an administrator or another person and then transmitted to the controller 116 or made available for access by the controller 116. When the inputs are available (via the "yes" route), at 704, then the controller 116 may update the allocation rules 114 based at least in part on the input from the input module 328. When the inputs are not available (via the "no" route from the decision operation 702), then the process 700 may advance to a decision operation 706.

At 706, the controller 116 may determine whether to update the allocation rules 114 based on the data from the analysis module 118. For example, the controller 116 may update the allocation rules 114 according to a schedule to shift the allocation from the version A to the version B (or between other versions) based on the results aggregated by the components of the analysis module 118. When the controller 116 determines to update the allocation rules 114 (via the "yes" route), at 704, then the controller may update the allocation rules based at least in part on the data from the analysis module 118. When the controller 116 determines not to update the allocation rules 114 (via the "no" route from the decision operation 706), then the process 700 may advance to a decision operation 708.

At 708, the controller 116 may determine whether to update an allocation of the system resources 120. The controller 116 may base the determination on the update of the rules at 704 (when the rules are updated) and/or on data from the performance analyzer 316 of the metrics analyzer 118. When the controller 116 determines to update the allocation of the system resources (via the "yes" route), at 710, then the controller may update the allocation of the system resources 120 based at least in part on the data from the analysis module 118. Following the operation 710, the process 700 may advance to the decision operation 702 to complete a loop process. When the controller 116 determines not to update the allocation of the system resources 120 (via the "no" route from the decision operation 708), then the process 700 may advance to the decision operation 702.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, via one or more computing devices, a request from a user;
   assigning, via at least one of the one or more computing devices, in response to the request and based at least in part on allocation rules, the user to a software component selected from a plurality of software components that are interchangeably executable within a framework;
   executing, via at least one of the one or more computing devices, the software component;
   measuring, via at least one of the one or more computing devices, system performance during execution of the software component;
   recording, via at least one of the one or more computing devices, a result of user interaction with the software component;
   aggregating, via at least one of the one or more computing devices, measurement of the system performance for individual ones of the plurality of software components;
   aggregating, via at least one of the one or more computing devices, results of the user interaction for individual ones of the plurality of software components; and
   modifying, via at least one of the one or more computing devices, the allocation rules based at least in part on the aggregated measurement of the system performance and the aggregated results of the user interaction to increase an allocation of one of the software components over another one of the software components of the plurality of software components.

2. The method as recited in claim 1, further comprising determining attributes of the user, and wherein the assigning is based at least in part on the determined attributes of the user.

3. The method as recited in claim 1, further comprising allocating resources to perform one of the plurality of software components based at least in part on the modifying of the allocation rules.

4. A computer-implemented method comprising:
   assigning a version of software to be used to satisfy a request, the version of software selected from a plurality of software versions that are interchangeably executable within a framework, the assigning based at least in part on allocation rules;
   executing, using one or more hardware processors, the version of software;
   obtaining resultant metrics during execution of the version of software;
   modifying, using the one or more hardware processors, the allocation rules based at least in part on the resultant metrics to increase an allocation of one version of software over another version of software of the plurality of software versions; and
   overriding, using the one or more hardware processors, the allocation rules at least in response to an output of a load balancer preventing a delay or latency exceeding a threshold value.

5. The method as recited in claim 4, wherein the resultant metrics includes system performance metrics.

6. The method as recited in claim 4, wherein the modifying occurs automatically and without user intervention for at least one modification of the allocation rules.

7. The method as recited in claim 4, wherein the modifying the allocation rules decreases an allocation of a version of software when the version of software is determined to have an anomaly in a use of system resources per request than another version of software based on the resultant metrics associated with system performance.

8. The method as recited in claim 4, further comprising allocating resources to execute one of the plurality of software versions based at least in part on the modifying of the allocation rules.

9. The method as recited in claim 4, wherein the assigning is performed using a load balancer and wherein the assigning is based at least in part on an output of the load balancer.

10. The method as recited in claim 4, further comprising aggregating the resultant metrics for individual ones of the plurality of software versions, and wherein the modifying the allocation rules is based at least in part on the aggregated resultant metrics.

11. The method as recited in claim 4, wherein the resultant metrics include use result metrics indicating a result of user interaction with the version of software, and wherein the modifying the allocation rules is based at least in part on the user result metrics.

12. The method as recited in claim 11, further comprising determining attributes of a user associated with the request, and wherein the assigning is based at least in part on the determined attributes of the user.

13. The method as recited in claim 12, further comprising:
associating use of individual ones of the plurality of software versions with at least one of the attributes;
determining a sample size for individual ones of the plurality of software versions with the at least one of the attributes, and
wherein the assigning is based at least in part on a comparison between the sample size for individual versions of software with the at least one of the attributes and a threshold sample size.

14. The method as recited in claim 11, wherein the modifying the allocation rules decreases an allocation of users to a version of software when the version of software is determined to have fewer positive results than another version of software, the positive results being results of user interaction with the version of software indicating completion of a predetermined designated event with the version of software.

15. One or more non-transitory computer-readable media storing computer-executable instructions that, when executed on one or more processors, performs acts comprising:
receiving use analysis data for a plurality of versions of software, the use analysis data providing metrics of user interaction with a version of the software;
determining a scheduled allocation shift that shifts an allocation from one version of the software to another version of the software; and
updating an allocation rule based at least in part on the use analysis data and the scheduled allocation shift, the allocation rule allocating individual requests to one of the plurality of versions of software; and
overriding the allocation rule at least in response to an output of a load balancer preventing a delay or latency exceeding a threshold value.

16. The one or more non-transitory computer-readable media as recited in claim 15, further comprising reallocating system resources based at least in part on the use analysis data.

17. The one or more non-transitory computer-readable media as recited in claim 15, further comprising reallocating system resources based at least in part on the updating of the allocation rule.

18. The one or more non-transitory computer-readable media as recited in claim 15, further comprising overriding the allocation rule at least in response to an output of a load balancer.

19. A system, comprising:
one or more processors;
memory; and
a controller stored in the memory and executable by the one or more processors, the controller operable to:
receive use analysis data for a plurality of versions of software, the use analysis data providing metrics of user interaction with a version of the software;
track sample size data for a plurality of attributes for individual ones of the versions of software;
update an allocation rule based at least in part on the use analysis data and the sample size data, the allocation rule allocating individual users to one of the plurality of versions of software; and
override the allocation rule at least in response to an output of a load balancer.

20. The system as recited in claim 19, wherein the controller is further operable to reallocate system resources based at least in part on the use analysis data or the update of the allocation rule.

21. The system as recited in claim 19, wherein the controller is further operable to determine a scheduled allocation shift that shifts an allocation from one version of the software to another version of the software, and wherein the update of the allocation rule is based at least in part on the scheduled allocation shift and the use analysis data.

22. The system as recited in claim 19, further comprising an allocation module to implement the allocation rules and assign users to one of the plurality of versions of software.

* * * * *